(12) United States Patent
Grebenik et al.

(10) Patent No.: US 8,402,266 B2
(45) Date of Patent: Mar. 19, 2013

(54) EXTENSIBLE ROLE-BASED ACCESS CONTROL MODEL FOR SERVICES

(75) Inventors: Vladimir V. Grebenik, Redmond, WA (US); Pretish Abraham, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 424 days.

(21) Appl. No.: 12/475,612

(22) Filed: Jun. 1, 2009

(65) Prior Publication Data

US 2010/0306008 A1    Dec. 2, 2010

(51) Int. Cl.
*H04L 29/06* (2006.01)
(52) U.S. Cl. ........................................ 713/164; 713/166
(58) Field of Classification Search .................. None
See application file for complete search history.

(56) References Cited

U.S. PATENT DOCUMENTS

| | | | |
|---|---|---|---|
| 5,911,143 A * | 6/1999 | Deinhart et al. ...................... 1/1 |
| 7,340,469 B1 | 3/2008 | Alghathbar et al. | |
| 7,403,925 B2 * | 7/2008 | Schlesinger et al. ............ 705/64 |
| 7,404,203 B2 | 7/2008 | Ng | |
| 2002/0026592 A1 * | 2/2002 | Gavrila et al. ................ 713/201 |
| 2007/0180490 A1 | 8/2007 | Renzi et al. | |
| 2008/0016580 A1 | 1/2008 | Dixit et al. | |
| 2008/0134320 A1 | 6/2008 | Desai et al. | |
| 2008/0162930 A1 | 7/2008 | Finney et al. | |

OTHER PUBLICATIONS

Ni, Qun, "P-RBAC Family Models", Retrieved at <<http://www.cs.purdue.edu/homes/ni/prbac.html>>, Mar. 8, 2009.
Brampton, Martin, "Administering RBAC in PHP 5 CMS Framework", Retrieved at <<http://www.webreference.com/programming/php_5_cms_framework_development2/>>, Mar. 8, 2009.
Neumann, et al., "A Scenario-Driven Role Engineering Process for Functional RBAC Roles", Proceedings of the seventh ACM symposium on Access control models and technologies, Retrieved at <<http://wi.wu-wien.ac.at/home/mark/publications/sacmat02.ps.gz>>, Jun. 3-4, 2002.
Parkin, et al., "Non-Intrusive, Flexible, Role-Based Authorization Extensions for WSRF::Lite", Proceedings of the UK e-Science All Hands Conference 2007, Retrieved at <<http://www.allhands.org.uk/2007/proceedings/papers/807.pdf>>, 2007, pp. 1-8.
Falkner, James, "Proposal for RBAC Features for SDD", Retrieved at <<http://www.oasis-open.org/committees/download.php/20663/RBAC%20for%20SDD.ppt>>, Oct. 11, 2006.

* cited by examiner

*Primary Examiner* — Paul Danneman
(74) *Attorney, Agent, or Firm* — Hope Baldauff Hartman, LLC (57) ABSTRACT

Architecture removes the limitation of a fixed set of roles and scopes, allows more effective permission auditing, and provides a convenient delegation model. Administrators can create roles fine-tuned to business needs without changing permissions on the resources. The new roles can be easily examined and delegated to other administrators. Moreover, scoping and delegation is simplified. This is possible because permissions are granted as a role (a unit of permission assignment is a role), which can include multiple entries. The entries correspond to end-user actions and are not related to implementation-dependent resource rights. The actions can include web services or API calls, script or executable file names, specialized commands that implement particular operation, and associated parameters, etc., essentially any action that the end-user performs.

19 Claims, 10 Drawing Sheets

EXTENSIBLE ROLE-BASED ACCESS CONTROL MODEL FOR SERVICES

BACKGROUND

The management of complex services associated with enterprise messaging can be difficult. For example, there are multiple users/administrators that need to have different levels of access. Assigning these permissions with sufficient granularity over a multitude of heterogeneous resources (e.g., files, email items, objects in directory, etc.) is a challenging task because the assignment depends on what user needs to perform the associated business function, as well as implementation details of what these business functions need to touch in order to perform the desired action.

These implementation details can change over time. For example, creating a new mailbox requires permissions to create a new user account, to modify several properties, and to access a particular mailbox database.

Additionally, the auditing of resources-level permissions is difficult because the permissions are spread over directories, file systems, mailboxes, etc. Even if there was a way to accurately obtain all ACLs (access control lists) relevant to a particular user, it would still be challenging to explain why a particular permission is needed (e.g., which business function requires the permission). Moreover, with multiple administrators touching permissions it is easy to misconfigure ACLs.

A relatively recent technology, a role-based access control (RBAC) model employs fixed set of roles that relate to job functions. RBAC works by assigning fixed permissions to all resources needed by a user to perform actions related to the role. However, various business processes in different organizations require the ability to modify existing roles and create new ones. The rigid fixed-role RBAC model limits the ability of administrators to evolve operations with the changing organization.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture removes the limitation of a fixed set of roles and scopes, allows more effective permission auditing, and provides a convenient delegation model. Administrators can create roles fine-tuned to business needs without changing permissions on the resources. The new roles can be easily examined and delegated to other administrators. Moreover, scoping and delegation is simplified.

This is possible because permissions are granted as a unit of permission assignment ("role"), which can include multiple entries. The entries correspond to end-user actions and are not related to implementation-dependent resource rights. The actions can include web services or API calls, script or executable file names, specialized commands (or "cmdlets") that implement particular operations, and associated parameters, essentially any action that the end-user performs.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

In the disclosed architecture, permissions are not associated with a resource, but with the executing principal. This makes auditing easy by simply examining which roles the user is assigned (as opposed to existing systems that examine every possible resource in the system). Roles include actions and are centrally located, so it is easy to create new roles or modify existing ones without touching numerous resources. Scopes define the boundaries over which a role can operate.

Roles include actions (also referred to as cmdlets or "commandlets") and action parameters. For example, in order to create a new mailbox, an administrator needs to be granted a number of permissions. A full list of such permissions is hard to get, and it is not reliable as software evolves. Rather, the administrator can be granted a "new-mailbox" cmdlet with certain parameters, and will not need to be concerned about individual permissions.

The architecture removes the limitation of a fixed set of roles and scopes, allows easy permission auditing, and provides a convenient delegation model. For example, administrators can create custom roles fine-tuned to a local business need without changing permissions on the resources. These new roles can be easily examined and delegated to other administrators (scoping and delegation is now made easy).

This is possible because permissions are granted as a unit of permission assignment ("role"), which can include multiple entries. These entries correspond to end-user actions and are not related to implementation-dependent resource rights. These actions can be web services or API calls, script or executable file names, cmdlets and parameters, etc., essentially any action that end-user performs.

The classic access control list (ACL) model defines a few generic permissions such as Read, Write, Create, and Delete. These permissions are applied to various entities (e.g., objects, attributes) and thereby, create a flexible system. For example, having "write" permission on a user "mail" attribute allows mail-enabling and mail-disabling of such user. Having the same permission on the entire database object allows all possible configuration operations on a database. Thus, the variety in permissions is achieved by the permissions being applied to a large variety of resources. This is limiting, since it is desirable to define action-oriented permissions (e.g., allow one user to send email as another user).

The disclosed architecture defines action-oriented permissions. In the example above, when having write permission on the user "mail" attribute, there is no way to allow just mail-enabling, but not mail-disabling. Both operations require the same access. However, from the end-user point of view these are two very different actions.

Actions that an administrator/user can perform are numerous (e.g., hundreds of cmdlets such as enable-mailuser, and thousands of parameters). A one-extended-right-per-action approach does not work because there are so many actions, and the list of actions keeps changing and growing. Space limitations could be a factor in the security descriptor.

The number and nature of roles needs to be flexible both from the evolutionary standpoint (to keep adding features) and customer needs. That is, users want customizable security. These factors prompt the creation of an architecture where permissions are associated with the user via role assignments and scopes, rather than with resources. In addition, this system is much easier to audit and maintain.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
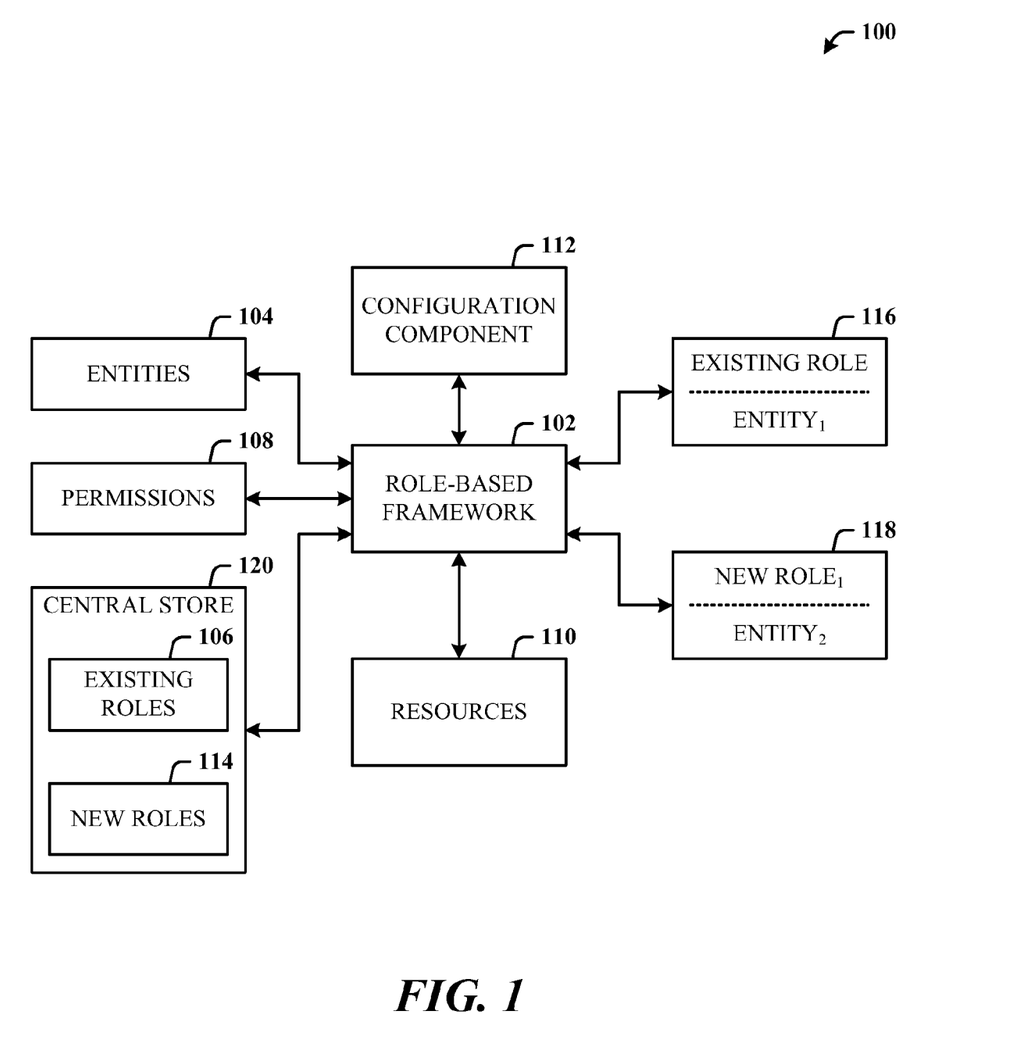
FIG. 1 illustrates a computer-implemented administration system in accordance with the disclosed architecture.

FIG. 1 illustrates a computer-implemented administration system 100 in accordance with the disclosed architecture. The system 100 includes a role-based framework 102 for assigning entities 104 to existing roles 106, the existing roles 106 associated with permissions 108 for allowing access to resources 110 of an organization. An output of the role-based framework 102 can be an existing role 116 assigned to a first entity and/or a new role 118 assigned to a second entity.

The system 100 can also include a configuration component 112 associated with the role-based framework 102 for creating and configuring new roles 114 designated for new functions of the organization. The existing roles 106 and new roles 114 are extensible and map to user actions.

Each role includes one or more role entries that define the permissions for that role. The configuration component 112 enables modification of existing roles 106 by adding or removing role entries. The permissions 108 are defined as entries in a role (e.g., existing roles 106, new roles 114), and each entry includes an action and an action parameter. The new roles 114 and existing roles 106 are stored centrally (in a central store 120) as a catalog of roles. The catalog includes at least one of a list of entries of existing and new roles, role type information for denoting a purpose of a role, read limitations on which object a read operation can be applied, or write limitations on which object a write operation can be applied. The role-based framework 102 and configuration component 112 can be applied to the administration of different applications, such as associated with a messaging infrastructure that includes email accounts and mailbox resources.

Figure 2:
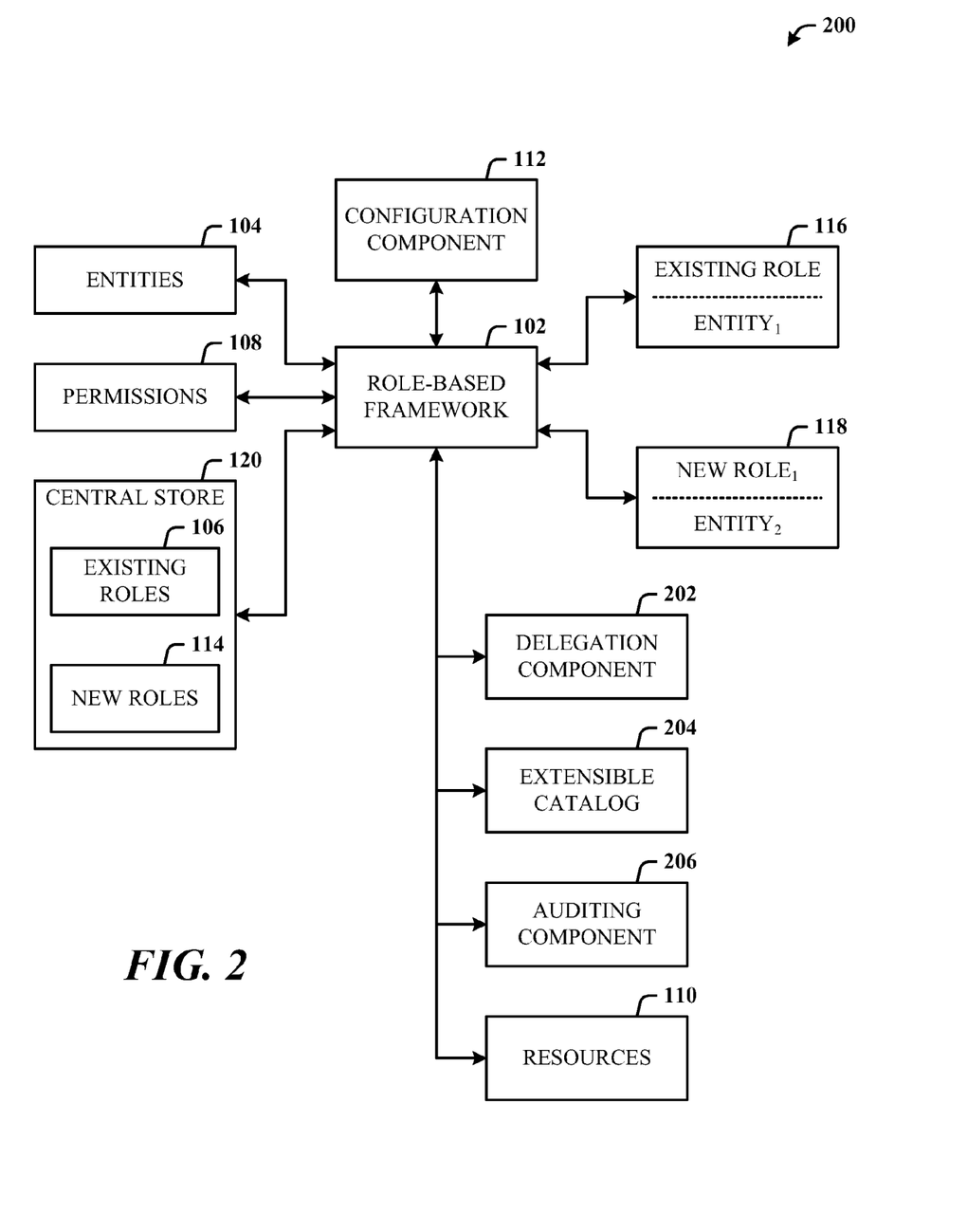
FIG. 2 illustrates an alternative embodiment of a system for role-based administration of organizational resources.

FIG. 2 illustrates an alternative embodiment of a system 200 for role-based administration of organizational resources 110. The system 200, as illustrated, includes the system 100 with the addition of a delegation component 202 for providing delegation functionality, an extensible catalog 204 of actions and action parameters, and an auditing component 206 for auditing roles and permissions, for example. The delegation component 202 facilitates the delegation by a user in one role of specific access to another user of a lesser role. The extensible catalog 204 is illustrated as separate from the central store 120; however, it is to be understood that the extensible catalog 204 can be stored and maintained as part of the central store 120 for central access by different administrators, for example.

Put another way, the administration system 200 comprises the role-based framework 102 as applied to a messaging infrastructure for assigning users (entities 104) to roles that include the existing roles 106 and the new roles 114, the roles associated with the permissions 108 for allowing access to messaging resources (resources 110). The system 200 also includes the central storage component (the central store 120) for storing and administering the roles (existing roles 106 and/or new roles 114) centrally. The system 200 can also includes the configuration component 112 as part of the role-based framework 102 for creating and configuring the new roles 114 for new messaging functions and modifying the existing roles 106 for changing messaging functions.

The permissions 108 are defined according to entries in a role, and each entry includes an action and an action parameter. The configuration component 112 enables modification of the roles by adding or removing role entries. The storage component includes at least one of a list of entries of existing and new roles, role type information for denoting a purpose of a corresponding role, read limitations on which resources a read operation is allowed, or write limitations on which resources a write operation is allowed.

Figure 3:
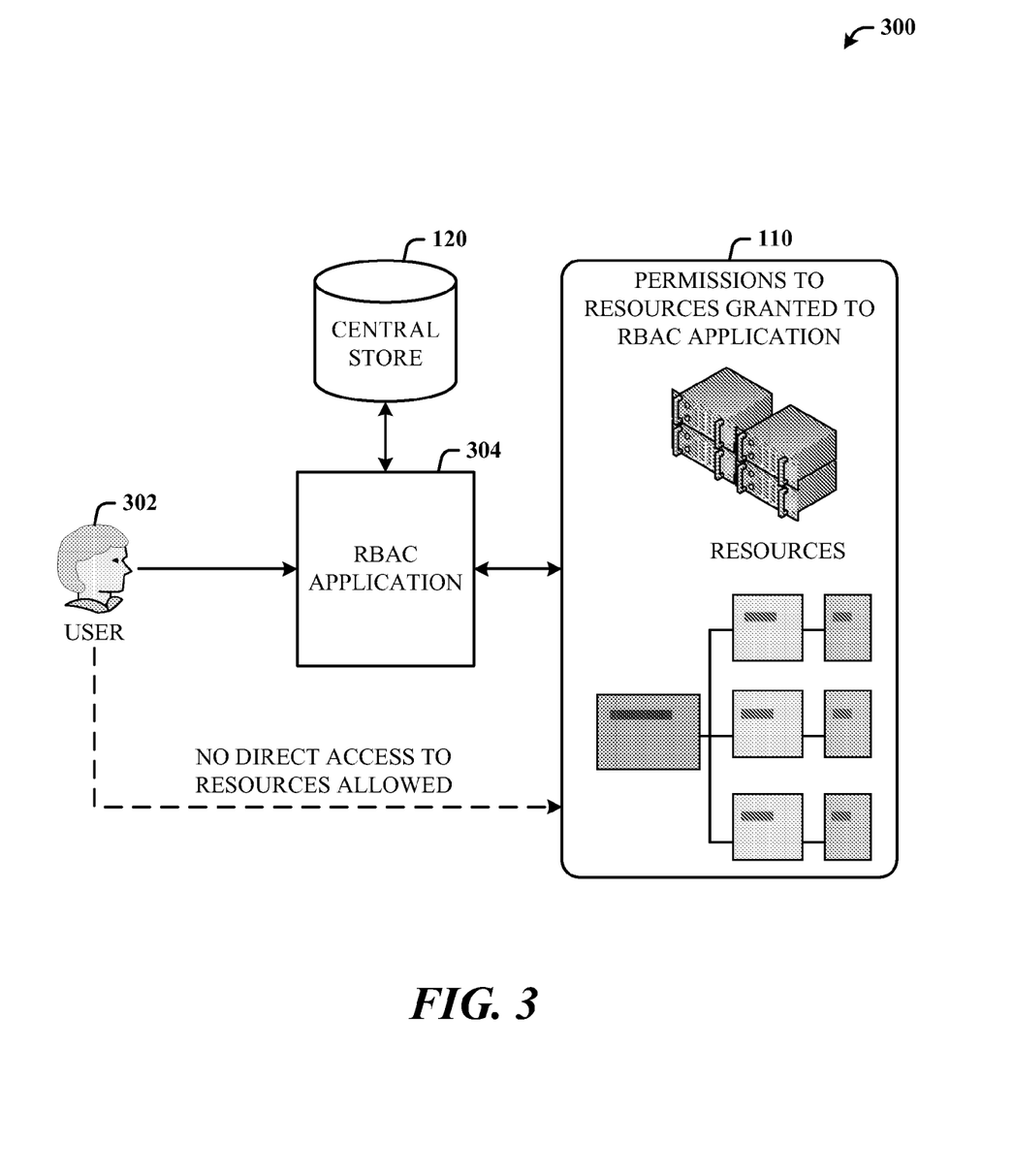
FIG. 3 illustrates an RBAC system for role-based control of resources.

FIG. 3 illustrates an RBAC system 300 for role-based control of resources 110. A user 302 interacts with the resources 110 (e.g., files, folders, datastores, servers, etc.) via an RBAC application 304. The RBAC application 304 accesses the central store 120 for existing and new roles to which the user can be assigned. The specific role(s) to which the user is assigned then allow the appropriate access to the resources 110. As illustrated, direct access is not allowed from the user 302 to the resources.

Figure 4:
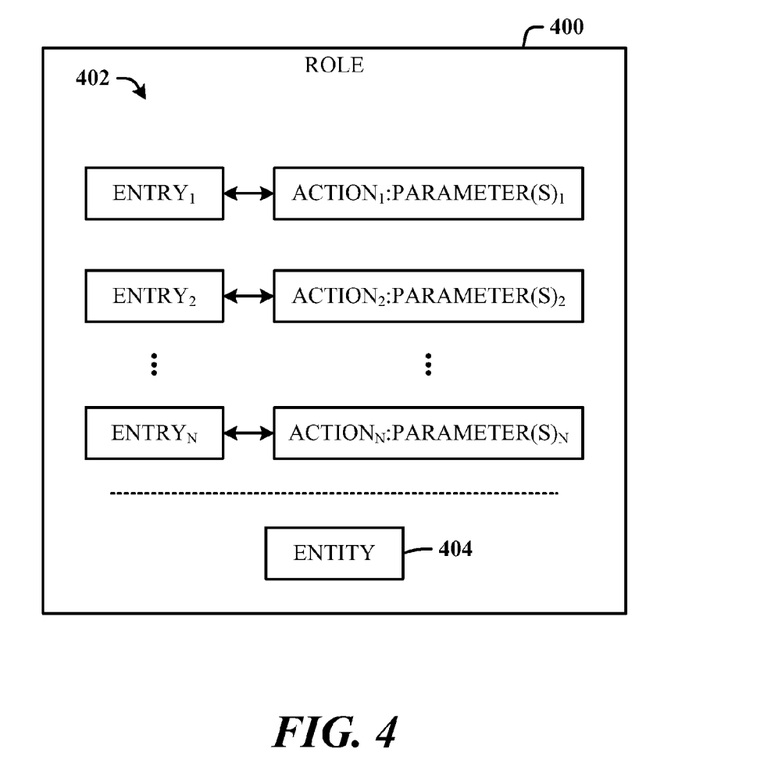
FIG. 4 illustrates an example of a role that promotes action-oriented permissions.

FIG. 4 illustrates an example of a role 400 that promotes action-oriented permissions. The role 400 includes entries (denoted Entry$_{1-N}$), and each entry is mapped to an action (denoted Action$_{1-N}$) and an action parameter (denoted Parameter(s)$_{1-N}$). These entry-action mappings 402 of the role 400 are then associated with an entity 404 (e.g., a user, system). Consider that if the set 1-N of mappings 402 is the current total set of the mappings that are employed, extensibility is provided to remove one or more of the mappings 402 to provide a new role for utilization in the RBAC framework. When a new mapping is created, the current set now includes one additional mapping thereby providing the capability for a new role. Thus, by mixing the combination of mappings, different roles can be employed for the correspondingly different organization functions, new or existing.

Figure 5:
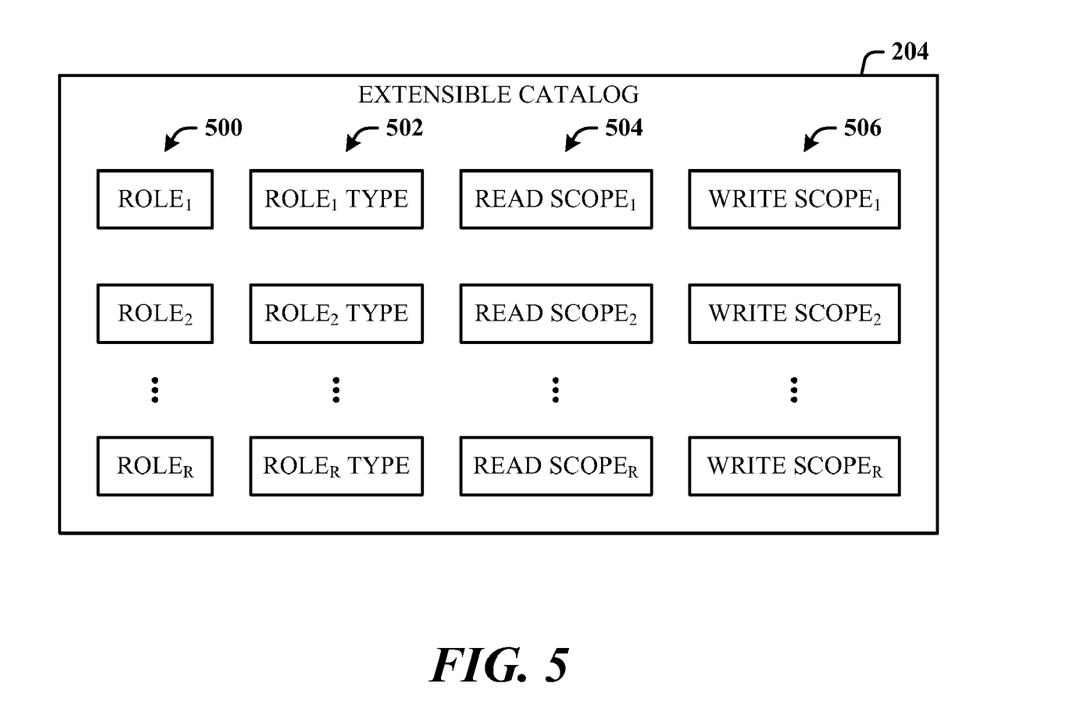
FIG. 5 illustrates an example of the extensible catalog for action-oriented permissioning.

FIG. 5 illustrates an example of the extensible catalog 204 for action-oriented permissioning. The extensible catalog 204 is created to list and store actions and action parameters as a management role. The catalog 204 includes at least the following pieces of information: a list 500 of role entries (actions and parameters), such as "Set-Mailbox—Identity—Title"; role types 502, that assist in understanding the purpose of a role, such as "Recipient Management"; implicit read scopes 504 and implicit write scopes 506, which scopes define a set of objects to which the actions are applied, such as "My Distribution Groups." Thus, granting mail-enabling permissions is as simple as modifying an existing role to only have "enable-mailuser" action with the desired action parameters and granting this role to a user. The intent is preserved, rather than translating the action-related intent into a set of resource permissions.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
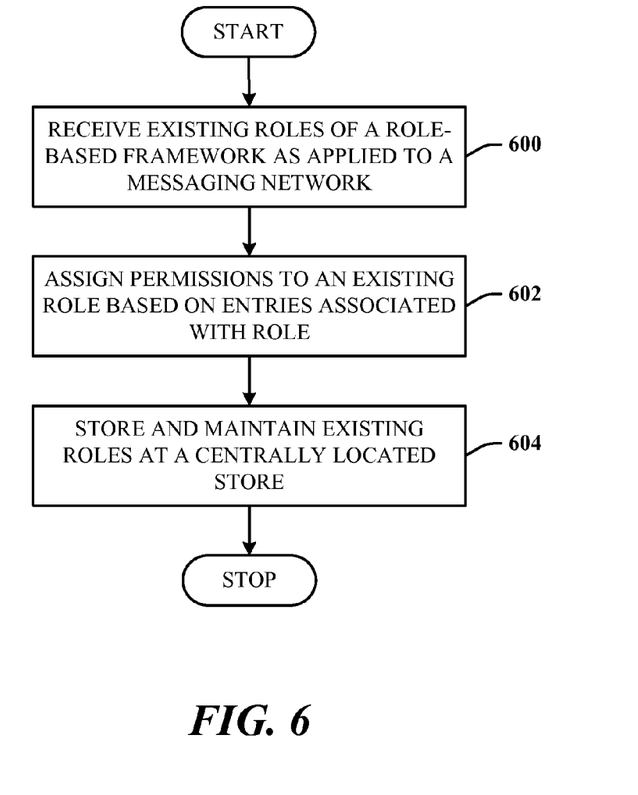
FIG. 6 illustrates an administration method in accordance with the disclosed architecture.

FIG. 6 illustrates an administration method in accordance with the disclosed architecture. At 600, existing roles of a role-based framework as applied to a messaging network are received. At 602, permissions are assigned to an existing role based on entries associated with the role. At 604, the existing roles are stored and maintained at a centrally located store.

Figure 7:
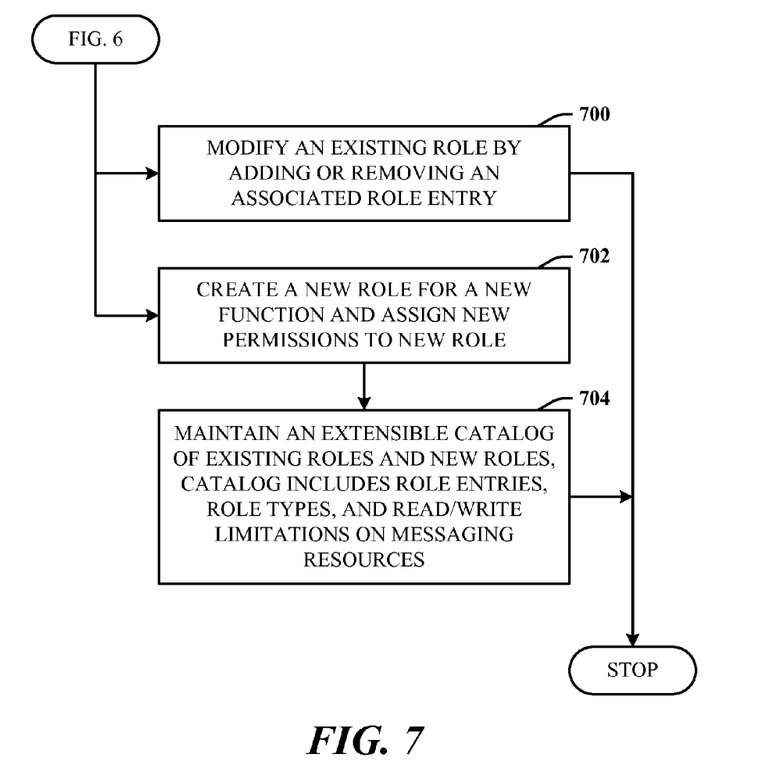
FIG. 7 illustrates additional aspects of the method of FIG. 6.

FIG. 7 illustrates additional aspects for the method of FIG. 6. At 700, an existing role is modified by adding or removing an associated role entry. At 702, a new role is created for a new function and new permissions are assigned to the new role. At 704, an extensible catalog of the existing roles and new roles is maintained. The catalog includes role entries, role types, and read/write limitations on messaging resources.

Figure 8:
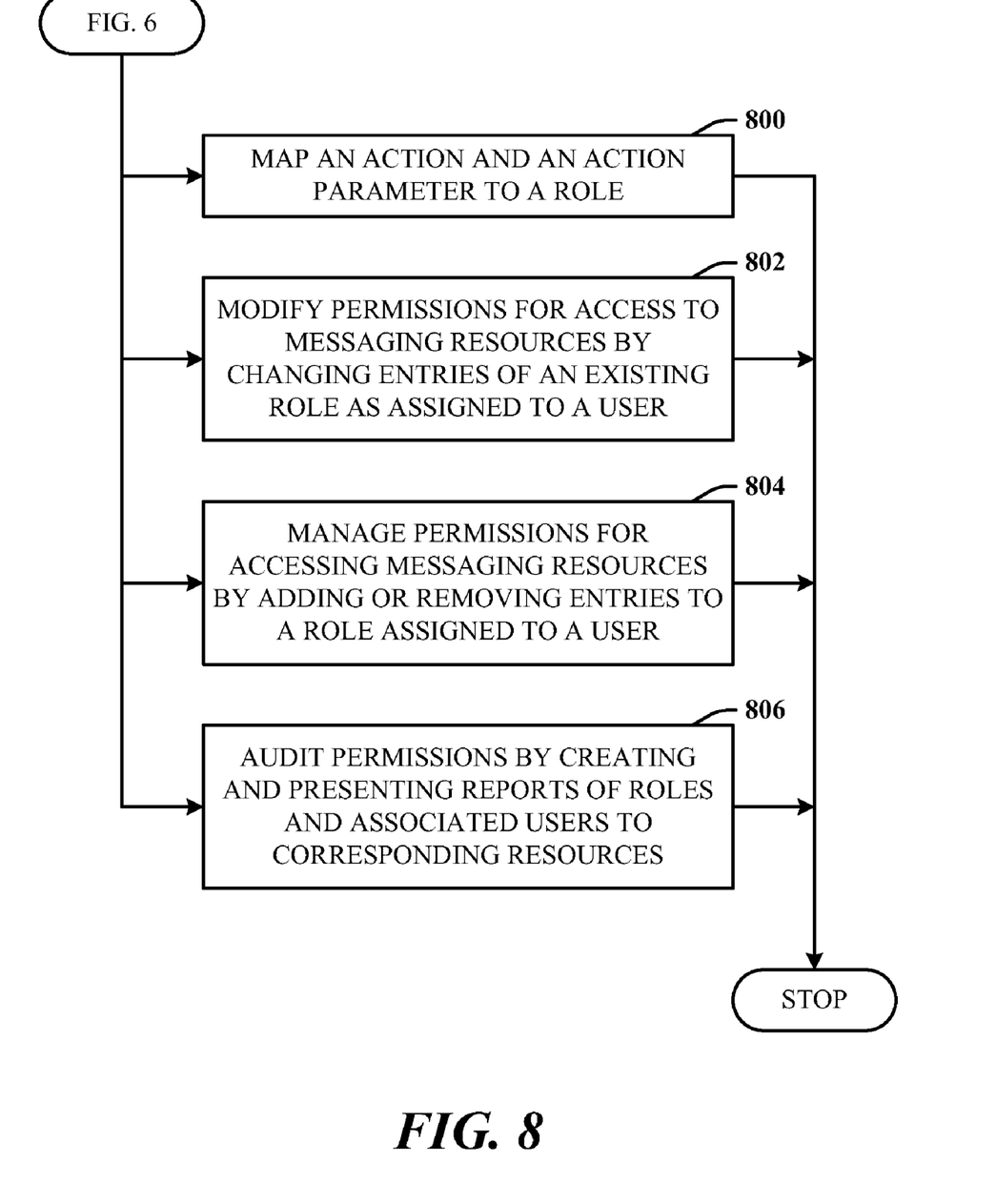
FIG. 8 illustrates additional aspects of the method of FIG. 6.

FIG. 8 illustrates additional aspects for the method of FIG. 6. At 800, an action and an action parameter are mapped to a role. At 802, permissions for access to messaging resources are modified by changing entries of an existing role as assigned to a user. At 804, the permissions for accessing messaging resources are managed by adding or removing entries to a role assigned to a user. At 806, the permissions are audited by creating and presenting reports of roles and associated users to corresponding resources.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical, solid state, and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 9:
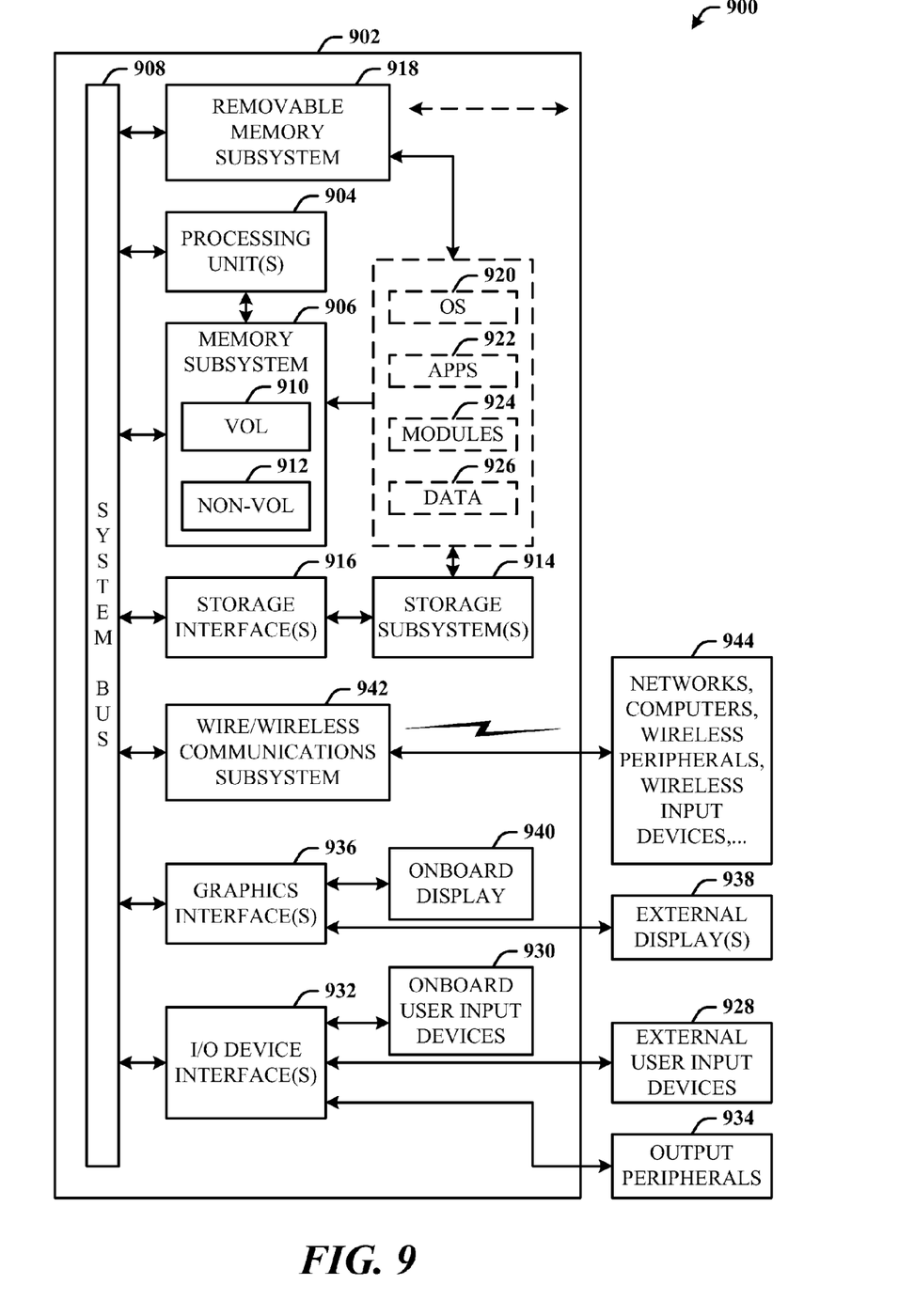
FIG. 9 illustrates a block diagram of a computing system operable to execute role-based administration in accordance with the disclosed architecture.

Referring now to FIG. 9, there is illustrated a block diagram of a computing system 900 operable to execute role-based administration in accordance with the disclosed architecture. In order to provide additional context for various aspects thereof, FIG. 9 and the following discussion are intended to provide a brief, general description of the suitable computing system 900 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 900 for implementing various aspects includes the computer 902 having processing unit(s) 904, a system memory 906, and a system bus 908. The processing unit(s) 904 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 906 can include volatile (VOL) memory 910 (e.g., random access memory (RAM)) and non-volatile memory (NON-VOL) 912 (e.g., ROM, EPROM, EEPROM, etc.). A basic input/output system (BIOS) can be stored in the non-volatile memory 912, and includes the basic routines that facilitate the communication of data and signals between components within the computer 902, such as during startup. The volatile memory 910 can also include a high-speed RAM such as static RAM for caching data.

The system bus 908 provides an interface for system components including, but not limited to, the memory subsystem 906 to the processing unit(s) 904. The system bus 908 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 902 further includes storage subsystem(s) 914 and storage interface(s) 916 for interfacing the storage subsystem(s) 914 to the system bus 908 and other desired computer components. The storage subsystem(s) 914 can include one or more of a hard disk drive (HDD), a magnetic floppy disk drive (FDD), and/or optical disk storage drive (e.g., a CD-ROM drive DVD drive), for example. The storage interface(s) 916 can include interface technologies such as EIDE, ATA, SATA, and IEEE 1394, for example.

One or more programs and data can be stored in the memory subsystem 906, a removable memory subsystem 918 (e.g., flash drive form factor technology), and/or the storage subsystem(s) 914 (e.g., optical, magnetic, solid state), including an operating system 920, one or more application programs 922, other program modules 924, and program data 926.

Where the computer 902 is a server machine, the one or more application programs 922, other program modules 924, and program data 926 can include the role-based framework 102, the configuration component 112, the permissions 108, the entities 104, the existing role 116 and the new role 118. The resources 110 can be remote from the server machine the central store can likewise be remote from the server machine. The one or more application programs 922, other program modules 924, and program data 926 can further include the delegation component 202, extensible catalog 204, auditing component 206, the role 400 and internal mappings 402, the extensible catalog 204 and roles 500, role types 502, read scopes 504, and write scopes 506 of FIG. 5, and the methods represented by the flow charts of FIGS. 6-8, for example.

Generally, programs include routines, methods, data structures, other software components, etc., that perform particular tasks or implement particular abstract data types. All or portions of the operating system 920, applications 922, modules 924, and/or data 926 can also be cached in memory such as the volatile memory 910, for example. It is to be appreciated that the disclosed architecture can be implemented with various commercially available operating systems or combinations of operating systems (e.g., as virtual machines).

The storage subsystem(s) 914 and memory subsystems (906 and 918) serve as computer readable media for volatile and non-volatile storage of data, data structures, computer-executable instructions, and so forth. Computer readable media can be any available media that can be accessed by the computer 902 and includes volatile and non-volatile media, removable and non-removable media. For the computer 902, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 902, programs, and data using external user input devices 928 such as a keyboard and a mouse. Other external user input devices 928 can include a microphone, an IR (infrared) remote control, a joystick, a game pad, camera recognition systems, a stylus pen, touch screen, gesture systems (e.g., eye movement, head movement, etc.), and/or the like. The user can interact with the computer 902, programs, and data using onboard user input devices 930 such a touchpad, microphone, keyboard, etc., where the computer 902 is a portable computer, for example. These and other input devices are connected to the processing unit(s) 904 through input/output (I/O) device interface(s) 932 via the system bus 908, but can be connected by other interfaces such as a parallel port, IEEE 1394 serial port, a game port, a USB port, an IR interface, etc. The I/O device interface(s) 932 also facilitate the use of output peripherals 934 such as printers, audio devices, camera devices, and so on, such as a sound card and/or onboard audio processing capability.

One or more graphics interface(s) 936 (also commonly referred to as a graphics processing unit (GPU)) provide graphics and video signals between the computer 902 and external display(s) 938 (e.g., LCD, plasma) and/or onboard displays 940 (e.g., for portable computer). The graphics interface(s) 936 can also be manufactured as part of the computer system board.

The computer 902 can operate in a networked environment (e.g., IP) using logical connections via a wired/wireless communications subsystem 942 to one or more networks and/or other computers. The other computers can include workstations, servers, routers, personal computers, microprocessor-based entertainment appliance, a peer device or other common network node, and typically include many or all of the elements described relative to the computer 902. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 902 connects to the network via a wired/wireless communication subsystem 942 (e.g., a network interface adapter, onboard transceiver subsystem, etc.) to communicate with wired/wireless networks, wired/wireless printers, wired/wireless input devices 944, and so on. The computer 902 can include a modem or has other means for establishing communications over the network. In a networked environment, programs and data relative to the computer 902 can be stored in the remote memory/storage device, as is associated with a distributed system. It will be appreciated that the network connections shown are exemplary and other means of establishing a communications link between the computers can be used.

The computer 902 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 10:
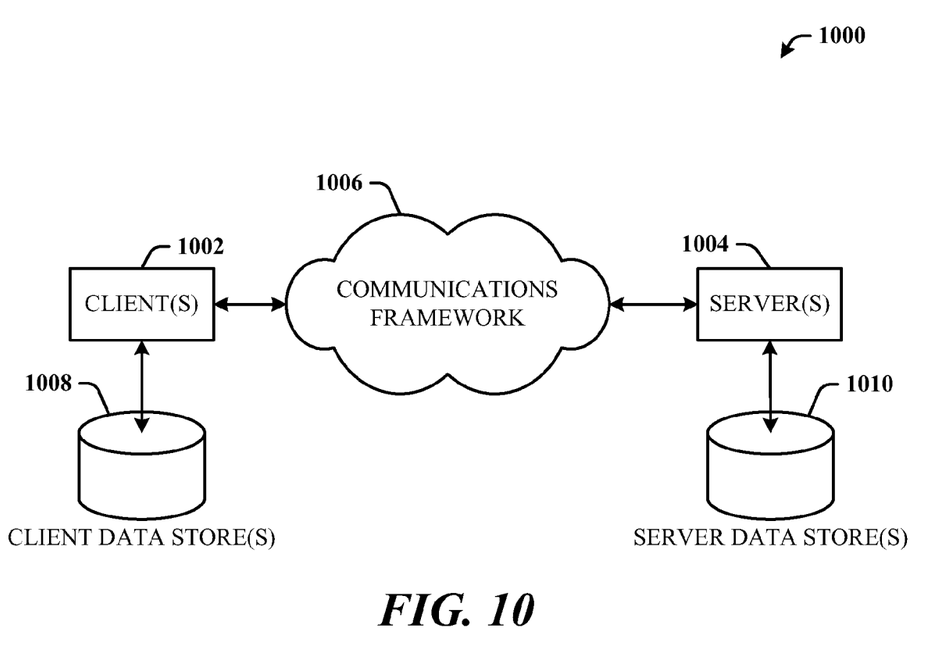
FIG. 10 illustrates a schematic block diagram of a computing environment that facilitates role-based administration.

Referring now to FIG. 10, there is illustrated a schematic block diagram of a computing environment 1000 that facilitates role-based administration. The environment 1000 includes one or more client(s) 1002. The client(s) 1002 can be hardware and/or software (e.g., threads, processes, computing devices). The client(s) 1002 can house cookie(s) and/or associated contextual information, for example.

The environment 1000 also includes one or more server(s) 1004. The server(s) 1004 can also be hardware and/or software (e.g., threads, processes, computing devices). The servers 1004 can house threads to perform transformations by employing the architecture, for example. One possible communication between a client 1002 and a server 1004 can be in the form of a data packet adapted to be transmitted between two or more computer processes. The data packet may include a cookie and/or associated contextual information, for example. The environment 1000 includes a communication framework 1006 (e.g., a global communication network such as the Internet) that can be employed to facilitate communications between the client(s) 1002 and the server(s) 1004.

Communications can be facilitated via a wire (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a computer executing a role-based administration component configured to
assign a user to existing roles, each of the existing roles comprising an entry defining an action with respect to messaging resources, the action comprising a commandlet that, when executed, implements a particular operation with respect to the messaging resources,
create a new role comprising a new entry defining a new action with respect to the messaging resources, the new action comprising a further commandlet that, when executed, implements a further particular operation with respect to the messaging resources, and
assign the user to the new role;
a storage component configured to store the roles, the storage component storing a list of data describing
the entry and the new entry,
information denoting a purpose of the existing roles and the new role,
a read limitation defining messaging resources for which read operations are to be allowed, and
a write limitation defining messaging resources for which write operations are to be allowed; and
a configuration component configured to modify at least one of the existing roles or the new role.

2. The system of claim 1, wherein each entry further comprises an action parameter associated with the action, and wherein each entry defines a permission.

3. The system of claim 1, wherein the configuration component is configured to modify the at least one of the existing roles or the new role by
adding a further new entry to the new role, or
removing an existing entry from at least one of the existing roles.

4. The system of claim 1, wherein at least one of the existing roles or the new role is extensible and maps to a user action.

5. The system of claim 1, wherein the entry and the new entry are stored as a catalog of roles.

6. The system of claim 1, further comprising an auditing component configured to audit permissions associated with a user by examining at least one of the existing roles or the new role.

7. A method comprising:
obtaining, at a computer executing a role-based administration component, existing roles, each of the existing roles comprising an entry defining an action with respect to a messaging network;
creating a new role for a new messaging function associated with the messaging network, the new role comprising a new entry defining the new messaging function;
assigning a user to roles, the roles comprising the new role and at least one of the existing roles and each of the roles defining a permission associated with the user with respect to the messaging network; and
storing the roles at a storage component storing a list of data describing
the entry and the new entry,
information for defining a purpose of the roles,
at least one read limitation defining messaging resources for which read operations are to be allowed for the user, and
at least one write limitation defining messaging resources for which write operations are to be allowed for the user.

8. The method of claim 7, further comprising modifying at least one of the roles by adding a further new entry to the roles or removing an existing entry from the roles.

9. The method of claim 7, further comprising mapping the action and an associated action parameter to at least one of the roles.

10. The method of claim 7, further comprising modifying the permission associated with the user by modifying an entry associated with one of the roles.

11. The method of claim 7, further comprising auditing permissions associated with the user by creating and presenting at least one of the roles.

12. The method of claim 7, wherein the action comprises an application programming interface call that, when executed by the computer, causes the computer to implement a particular operation via accessing an application programming interface.

13. The method of claim 7, wherein the action comprises a commandlet that, when executed by the computer, causes the computer to implement a particular operation with respect to the messaging resources.

14. The method of claim 13, wherein the commandlet comprises a new mailbox commandlet that, when executed by the computer, causes the computer to request a new mailbox associated with the messaging resources.

15. A computer readable medium that is not a signal, the computer readable medium comprising computer executable instructions stored thereon that, when executed by a computer, cause the computer to:
obtain existing roles, each of the existing roles comprising an entry defining an action with respect to a messaging resource, the action comprising a commandlet that, when executed by the computer, causes the computer to implement an operation with respect to the messaging resource;
create a new role for a new messaging function associated with the messaging resource, the new role comprising a new entry defining the new messaging function commandlet that, when executed by the computer, causes the computer to implement a new operation to perform the new messaging function with respect to the messaging resource;
assign a user to roles, the roles comprising the new role and at least one of the existing roles; and
store the roles at a storage component storing a list of data describing
the entry and the new entry,
information for defining a purpose of the roles,
at least one read limitation defining messaging resources for which read operations are to be allowed for the user, and at least one write limitation defining messaging resources for which write operations are to be allowed for the user.

16. The computer readable medium of claim 15, further comprising computer executable instructions that, when executed by the computer, cause the computer to modify at least one of the roles.

17. The computer readable medium of claim 15, wherein the roles are extensible and map to user actions.

18. The computer readable medium of claim 15, wherein the roles are stored as a catalog of roles.

19. The computer readable medium of claim 15, further comprising computer executable instructions that, when executed by the computer, cause the computer to audit permissions associated with a user by examining the roles.

* * * * *